United States Patent
Yamamoto

(10) Patent No.: US 8,702,509 B2
(45) Date of Patent: Apr. 22, 2014

(54) GAME SYSTEM, CONTROL METHOD OF CONTROLLING COMPUTER AND A STORAGE MEDIUM STORING A COMPUTER PROGRAM USED THEREOF

(75) Inventor: Takao Yamamoto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/634,500

(22) PCT Filed: Mar. 11, 2011

(86) PCT No.: PCT/JP2011/055828
§ 371 (c)(1),
(2), (4) Date: Sep. 12, 2012

(87) PCT Pub. No.: WO2011/115018
PCT Pub. Date: Sep. 22, 2011

(65) Prior Publication Data
US 2013/0005463 A1    Jan. 3, 2013

(30) Foreign Application Priority Data
Mar. 15, 2010    (JP) ................................. 2010-058108

(51) Int. Cl.
*A63F 13/00*    (2014.01)
(52) U.S. Cl.
USPC .......................................................... 463/31
(58) Field of Classification Search
USPC .................. 463/1, 3, 7, 23, 30, 31, 35, 43
See application file for complete search history.

(56) References Cited

U.S. PATENT DOCUMENTS

| | | |
|---|---|---|
| 6,379,244 B1 | 4/2002 | Sagawa et al. |
| 6,461,239 B1 | 10/2002 | Sagawa et al. |
| 6,582,309 B2 | 6/2003 | Higurashi et al. |
| 6,607,436 B1 | 8/2003 | Ueshima et al. |

(Continued)

FOREIGN PATENT DOCUMENTS

| | | |
|---|---|---|
| CN | 1215619 A | 5/1999 |
| CN | 1338962 A | 3/2002 |

(Continued)

OTHER PUBLICATIONS

International Search Report (date of mailing Jun. 14, 2011).

(Continued)

*Primary Examiner* — Ronald Laneau
(74) *Attorney, Agent, or Firm* — Howard & Howard Attorneys PLLC

(57) ABSTRACT

Disclosed is a game system comprising a monitor (3) that outputs the game screen display, a touch panel (5), and an external memory device (20) that stores sequence data (28) which records the operation timing for touch operation of a touch panel (5). The game system displays an object (60) that corresponds to the operation timing and an operation reference indicator (55) that corresponds to the current time in the game and guides the player's touch operation by reducing the distance between the object (60) and the operation reference indicator (55) according to the difference between the operation timing and the current time and by moving the object (60) such that the object (60) matches the operation reference indicator (55) at the operation timing. The game system also changes the distance between the object (60) and the operation reference indicator (55) in accordance with predetermined conditions.

13 Claims, 9 Drawing Sheets

(56) References Cited

U.S. PATENT DOCUMENTS

| | | | |
|---|---|---|---|
| 8,419,538 B2 * | 4/2013 | Mashimo et al. | 463/37 |
| 8,439,733 B2 * | 5/2013 | Kay et al. | 463/7 |
| 8,444,486 B2 * | 5/2013 | Kay et al. | 463/31 |
| 8,476,517 B2 * | 7/2013 | Humphrey | 84/470 R |
| 2009/0137296 A1 | 5/2009 | Takahashi et al. | |
| 2013/0053114 A1 * | 2/2013 | Nishimura et al. | 463/7 |
| 2013/0130761 A1 * | 5/2013 | Hayashi et al. | 463/7 |

FOREIGN PATENT DOCUMENTS

| | | | |
|---|---|---|---|
| CN | 101288807 A | 10/2008 | |
| JP | 2922509 B2 | 7/1999 | |
| JP | 3031676 B1 | 4/2000 | |
| JP | 3098422 U | 3/2004 | |
| JP | 2006-325885 A | 12/2006 | |
| JP | 2007-181650 A | 7/2007 | |
| JP | 4039776 B2 | 1/2008 | |

OTHER PUBLICATIONS

Chinese Office Action with English Translation (Date Issued May 30, 2013).

Korean Office Action with English Translation—Issued Oct. 16, 2013.

* cited by examiner

GAME SYSTEM, CONTROL METHOD OF CONTROLLING COMPUTER AND A STORAGE MEDIUM STORING A COMPUTER PROGRAM USED THEREOF

CROSS REFERENCE TO RELATED APPLICATION

This application is a national stage application of PCT/JP2011/055828, filed Mar. 11, 2011, which claims priority to Japanese Patent Application No. 2010-058108, filed Mar. 15, 2010, the disclosures of which are hereby incorporated by reference in their entirety.

TECHNICAL FIELD

The present invention relates to a game system in which an operation timing of an operating unit disposed in an input device is indicated to a player, a control method of controlling a computer and a storage medium storing a computer program a computer program used thereof.

BACKGROUND ART

There have been known game systems in which an operation timing of an operating unit disposed in an input device is indicated to a player in tune with a rhythm of music. Of the game systems, there is a game system including an obstructing device that hides a part of an operation indication mark used to indicate an operation timing during the progress of a game (for example, see Patent Literature 1). Besides, another background art related to the invention is disclosed in Patent Literature 2.
Patent Literature 1: Japanese Patent No. 3031676 and Patent Literature 2: Japanese Patent No. 2922509.

SUMMARY OF INVENTION

Technical Problem

In the game machine disclosed in Patent Literature 1, a timing mark serving as an operation indication mark moves toward a lower end serving as an operation reference mark. And, an obstruction of hiding a part of the operation indication mark is made to change a difficulty level of a game, and thus amusement of a game is improved. However, the operation indication mark merely moves to reduce a distance from the lower end with the lapse of time. For this reason, a development of a game is easily predicted.

In this regard, the invention is directed to provide a game system, a control method of controlling a computer and a storage medium storing a computer program used therein, which are capable of changing the distance between the operation indication mark and the operation reference mark according to a predetermined condition.

Solution to Problem

A game system of the present invention comprises: an input device that includes at least one operating unit; a display device that displays and outputs a game screen; a sequence data storage device that stores sequence data in which operation timing of the operating unit during a game is described; and an operation guide device that guides a player to operate the operating unit by causing an operation indication mark corresponding to the operation timing and an operation reference mark corresponding to a current time in the game to be displayed on the game screen based on the sequence data, generating relative displacement along a predetermined path according to the progress of the game between the operation indication mark and the operation reference mark such that a distance between the operation indication mark and the operation reference mark decreases based on a time difference between an operation timing guided through the operation indication mark and the current time, and the operation indication mark matches with the operation reference mark at the operation timing guided through the operation indication mark, and wherein the operation guide device includes a distance change device that changes a distance between the operation reference mark and the operation indication mark according to a predetermined condition.

According to the present invention, the distance between the operation reference mark and the operation indication mark can be changed according to a predetermined condition. For this reason, for example, the distance between the operation reference mark and the operation indication mark can be not only decreased but also increased. Thus, compared to the game development of the conventional game in which the distance between the operation reference mark and the operation indication mark is only decreased, it is difficult to predict the game development. For this reason, compared to the conventional game, the player further focuses his/her attention to change of the operation indication mark or the like. Thus, amusement of a game can be improved.

In an aspect of the game system of the present invention, the distance change device may use a predetermined operation as the predetermined condition, and change the distance between the operation reference mark and the operation indication mark in response to the predetermined operation. In this case, since the distance between the operation reference mark and the operation indication mark is changed in response to the player's operation, it is possible to make the player easily recognize relevance between a change in the distance between the operation reference mark and the operation indication mark and a predetermined operation.

The change in the distance between the operation reference mark and the operation indication mark may be made in an arbitrary manner. For example, in an aspect of the game system of the present invention, the distance change device may change the distance between the operation reference mark and the operation indication mark by changing a direction of the relative displacement along the predetermined path between the operation indication mark and the operation reference mark up to a predetermined position in a reverse direction. Further, in this aspect, the operation guide device may further include a direction change device that generates the relative displacement in an original direction from the predetermined position such that the operation indication mark matches with the operation reference mark at operation timing described in the sequence data. In this case, a direction of the relative displacement may be changed to a reverse direction, that is, a direction in which the distance between the operation indication mark and the operation reference mark increases, up to the predetermined position. Further, it is possible to return the relative displacement to the original direction in which the distance between the operation reference mark and the operation indication mark decreases from the predetermined position again according to the lapse of time, and the operation indication mark matches with the operation reference mark at the operation timing so that the operation timing can be guided. Thus, a new game development can be provided.

Further, any displacement may be generated as the relative displacement along a predetermined path between the operation indication mark and the operation reference mark. For example, in an aspect of the game system of the present invention, the operation guide device may move the operation indication mark toward the operation reference mark as the relative displacement along the predetermined path.

In an aspect of the game system of the present invention, the game system may further comprise an evaluating device that evaluates an operation in at least one operating unit based on timing of the operation on the operating unit and the operation timing designated in the sequence data. In this case, the timing of the operation on the operating unit can be evaluated based on the operation timing described in the sequence data. Thus, amusement of the game can be further improved. Furthermore, in this aspect, the distance change device may use an evaluation result of the evaluating device as the predetermined condition, and change the distance between the operation reference mark and the operation indication mark according to the evaluation result. In this case, the evaluation result on the player's operation can be reflected in a change in the distance between the operation reference mark and the operation indication mark.

In an aspect of the game system of the present invention, the input device may include a plurality of operating units, the operation timing may be described in the sequence data so as to be associated with information designating any one of the plurality of operating units, and the operation guide device may generate the relative displacement along the predetermined path in an aspect in which an operating unit corresponding to each operation timing can be discriminated. In this case, the distance between the operation reference mark and the operation indication mark can be changed in an aspect in which a correspondence relation with each operating unit can be discriminated.

Any aspect may be used as the aspect in which an operating unit corresponding to each operation timing can be discriminated. For example, in an aspect of the game system of the invention, the operation guide device may generate the relative displacement along the predetermined path in a aspect in which an operating unit corresponding to each operation timing can be discriminated by displaying a plurality of paths each of which is discriminated for each operating unit and corresponds to each operating unit on the game screen as the predetermined path.

Further, any device may be used as the input device. For example, in an aspect of the game system of the present invention, a touch panel arranged on the display device so as to cover the game screen may be used as the input device.

In an aspect of the game system of the present invention, the game system may further comprise: an audio output device that reproduces and outputs a game sound; a music data storage device that stores music data for reproducing music; and a music reproducing device that causes the audio output device to reproduce the music based on the music data, and wherein the operation timing of the operating unit during reproduction of the music is described in the sequence data. In this case, it is possible to achieve a music game in which displacement occurs such that the operation indication mark matches with the operation reference mark at an operation timing corresponding to a rhythm of the music, and the distance between the operation reference mark and the operation indication mark can be changed according to a predetermined condition.

A control method of controlling a computer of the present invention is a control method of controlling a computer which is incorporated in a game system comprising: an input device that includes at least one operating unit; a display device that displays and outputs a game screen; a sequence data storage device that stores sequence data in which operation timing of the operating unit during a game is described, wherein the control method of controlling the computer comprises the steps: an operation guide step that guides a player to operate the operating unit by causing an operation indication mark corresponding to the operation timing and an operation reference mark corresponding to a current time in the game to be displayed on the game screen based on the sequence data, generating relative displacement along a predetermined path according to the progress of the game between the operation indication mark and the operation reference mark such that a distance between the operation indication mark and the operation reference mark decreases based on a time difference between an operation timing guided through the operation indication mark and the current time, and the operation indication mark matches with the operation reference mark at the operation timing guided through the operation indication mark; and a distance change step that changes a distance between the operation reference mark and the operation indication mark according to a predetermined condition in the operation guide step.

A storage medium storing a computer program for a game system of the present invention is a storage medium storing a computer program for a game system comprising: an input device that includes at least one operating unit; a display device that displays and outputs a game screen; a sequence data storage device that stores sequence data in which operation timing of the operating unit during a game is described, wherein the computer program is configured to cause a computer which is incorporated in the game system to serve as; an operation guide device that guides a player to operate the operating unit by causing an operation indication mark corresponding to the operation timing and an operation reference mark corresponding to a current time in the game to be displayed on the game screen based on the sequence data, generating relative displacement along a predetermined path according to the progress of the game between the operation indication mark and the operation reference mark such that a distance between the operation indication mark and the operation reference mark decreases based on a time difference between an operation timing guided through the operation indication mark and the current time, and the operation indication mark matches with the operation reference mark at the operation timing guided through the operation indication mark, and the computer program is configured to further cause the operation guide device to serve as; a distance change device that changes a distance between the operation reference mark and the operation indication mark according to a predetermined condition. It is possible to actualize the game system of the present invention by executing the control method of controlling a computer of the present invention or the computer program for a game system.

Advantageous Effects of Invention

As described above, according to the present invention, it is possible to change the distance between the operation indication mark and the operation reference mark according to a predetermined condition.

DESCRIPTION OF EMBODIMENTS

Figure 1:
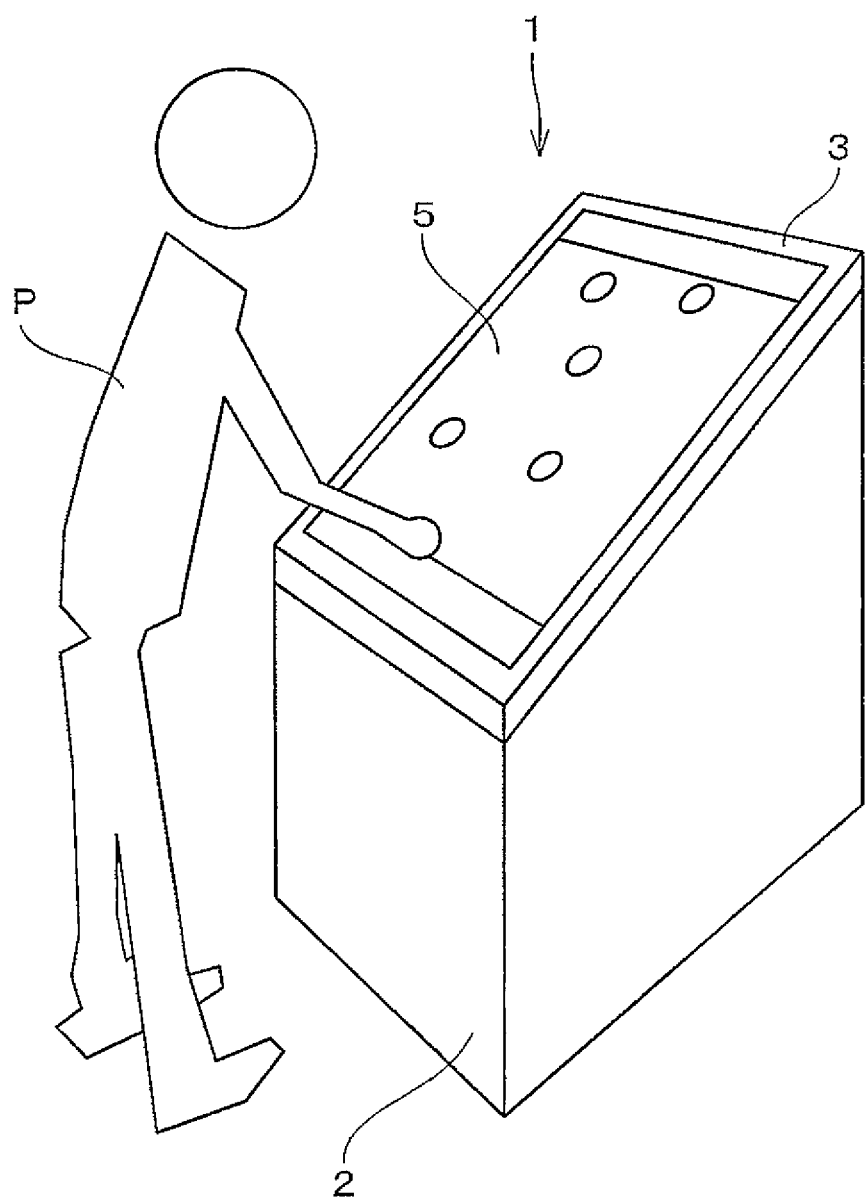
FIG. 1 is a diagram illustrating an example of a game machine to which a game system according to an embodiment of the invention is applied.

Hereinafter, an embodiment of a game system according to the invention will be described. FIG. 1 is a diagram illustrating a game machine for business use to which a game system according to an embodiment of the invention is applied. As illustrated in FIG. 1, a game machine 1 includes a casing 2, and a monitor 3 serving as a display device arranged, obliquely toward a player P side, on the top surface of the casing 2. A transparent touch panel 5 serving as an input device is superimposed on the surface of the monitor 3. The touch panel 5 is a known input device that outputs a signal corresponding to a contact position when the player P contacts the touch panel 5 with his/her finger or the like. In addition, the game machine 1 includes various kinds of input devices and output devices disposed in a typical game machine for business use such as a button used to make a selection or a decision, a power switch, a volume operation switch, and a power lamp, which are not illustrated in FIG. 1.

Figure 2:
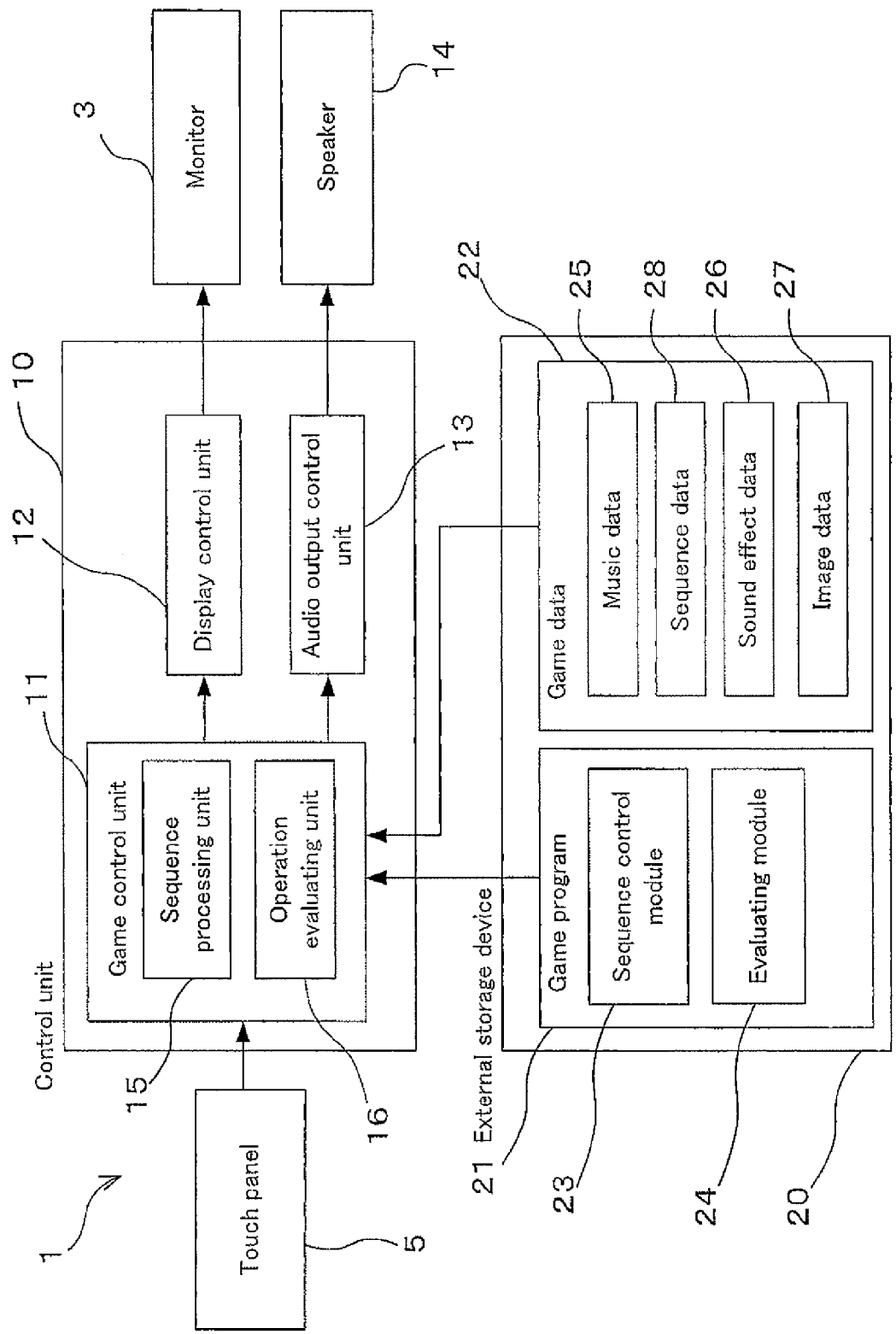
FIG. 2 is a functional block diagram of a game machine.

FIG. 2 is a functional block diagram of the game machine 1. As illustrated in FIG. 2, a control unit 10 serving as a computer is disposed in the casing 2. The control unit 10 includes a game control unit 11 serving as a control host, a display control unit 12 that operates according to an output from the game control unit 11, and an audio output control unit 13. The game control unit 11 is configured as a unit in which a microprocessor is combined with various kinds of peripheral devices such as an internal storage device (for example, a read only memory (ROM) or a random access memory (RAM)) necessary for an operation of the microprocessor. The display control unit 12 causes a predetermined image to be displayed on the monitor 3 by rendering an image corresponding to image data provided from the game control unit 11 in a frame buffer and then outputting a video signal corresponding to the rendered image to the monitor 3. The audio output control unit 13 causes a predetermined sound (including music or the like) to be reproduced from a speaker 14 serving as an audio output device by generating an audio reproduction signal corresponding to audio reproduction data provided from the game control unit 11 and then outputting the generated audio reproduction signal to the speaker 14 connected to the control unit 10.

An external storage device 20 is connected to the game control unit 11. As the external storage device 20, there is used a storage medium in which data remains stored even when power is not supplied such as an optical storage medium including a digital versatile disc-read only memory (DVD-ROM) and a compact disc-read only memory (CD-ROM), a non-volatile semiconductor memory device including an electrically erasable programmable read-only memory (EEPROM).

A game program 21 and game data 22 are stored in the external storage device 20. The game program 21 is a computer program necessary for the game machine 1 to execute a music game according to a predetermined procedure, and includes a sequence control module 23 and an evaluating module 24 in order to achieve a function according to the invention. When the game machine 1 is activated, the game control unit 11 executes various kinds of initial settings necessary to operate the game machine 1 by executing an operation program stored in an internal storage device thereof, and then sets an environment in which a music game is executed according to the game program 21 by reading the game program 21 from the external storage device 20 and then executing the game program 21. When the sequence control module 23 of the game program 21 is executed by the game control unit 11, a sequence processing unit 15 is generated in the game control unit 11. Further, when the evaluating module 24 of the game program 21 is executed by the game control unit 11, an operation evaluating unit 16 is generated in the game control unit 11. The sequence processing unit 15 and the operation evaluating unit 16 are logical devices actualized by a combination of computer hardware and a computer program. The sequence processing unit 15 executes a music game process which includes instructing the player to make an operation in tune with reproduction of music selected by the player, generating a sound effect in response to the player's operation, or the like. The operation evaluating unit 16 executes a process which includes evaluating the player's operation and then controlling a game based on an evaluation result, or the like. In addition, the game program 21 includes various kinds of program modules necessary to execute a music game in addition to the modules 23 and 24, and logical devices corresponding to the modules are generated in the game control unit 11 although not illustrated.

The game data 22 includes various pieces of data to be referred to when a music game is executed according to the game program 21. For example, the game data 22 includes music data 25, sound effect data 26, and image data 27. The music data 25 is data necessary to cause music which is a target of a game to be reproduced and output from the speaker 14. FIG. 2 illustrates a single kind of music data 25, but the player can actually select a piece of music to be played from among a plurality of pieces of music. In the game data 22, one or more pieces of music data 25 are recorded in association with information identifying each piece of music. The sound effect data 26 is data in which each of one or more types of sound effects to be output from the speaker 14 in response to the player's operation is recorded in associated with a unique code for each sound effect. Sounds of musical instruments and various kinds of sounds are included as the sound effect. Pieces of sound effect data which are equal in number to a predetermined octave number and have different musical pitches according to a sound type are prepared. The image data 27 is data for causing a background image, various kinds of objects or icons, and the like in a game screen to be displayed on the monitor 3.

The game data 22 further includes sequence data 28. The sequence data 28 is data used to define an operation timing to be indicated to the player. At least one sequence data 28 is prepared for a single music data. The details of the sequence data 28 will be described later.

Figure 3:
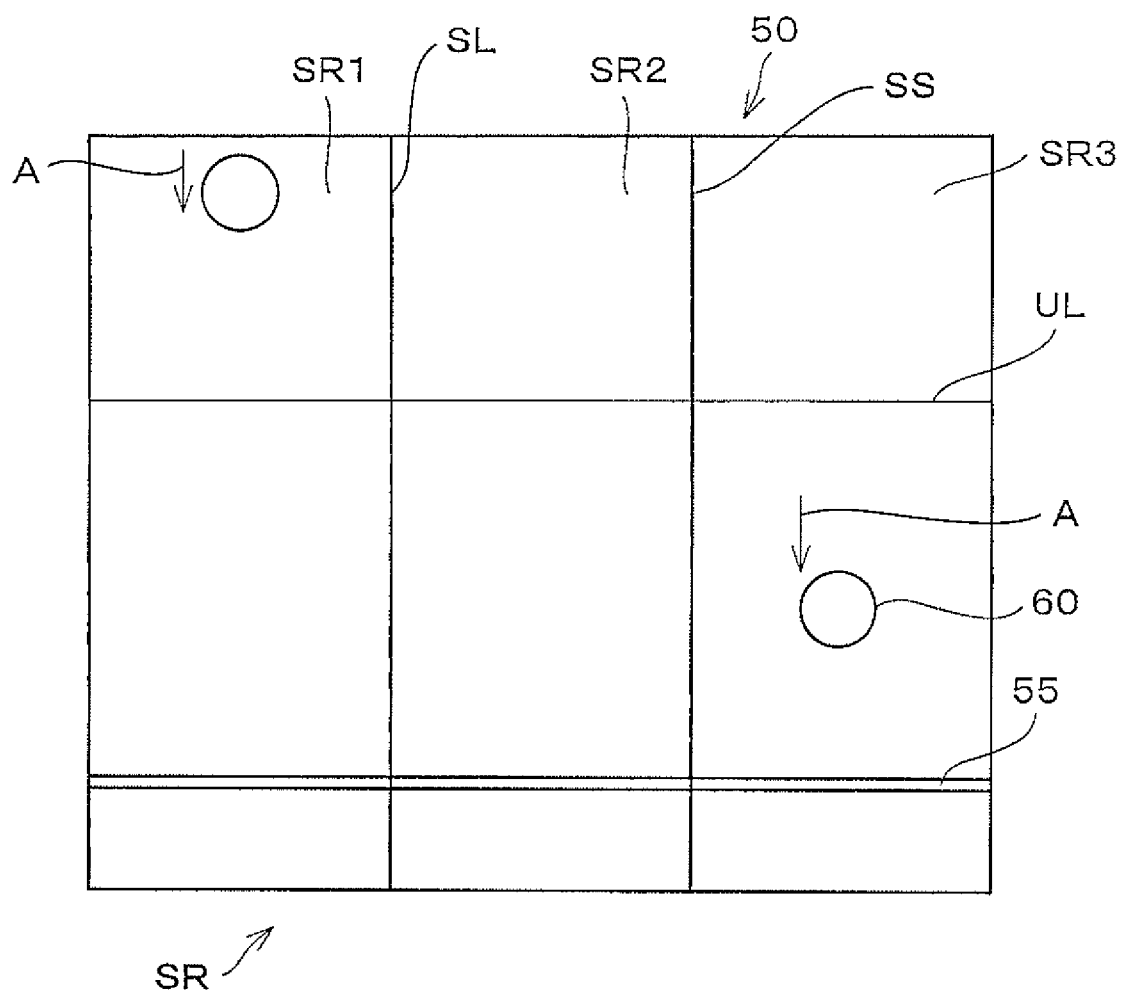
FIG. 3 is a diagram schematically illustrating a game screen.

Next, an outline of a music game executed by the game machine 1 will be described. The game machine 1 is configured as a music game machine of a type that evaluates an operation timing thereof or the like when the player executes an operation in tune with music. A game screen is displayed on the monitor 3 while the music game is being executed through the game machine 1. FIG. 3 is a diagram schematically illustrating the game screen. As illustrated in FIG. 3, a plurality of lanes SR serving as a predetermined path, which extend in a vertical direction, are displayed on the game screen 50. The plurality of lanes SR are visually separated by means such as three separator lines SS of a first lane SR1, a second lane SR2, and a third lane SR3 arranged in order from the left. An operation reference mark 55 is displayed on lower end portions of the three lanes SR so as to cross the lanes SR1, SR2, and SR3. Further, an upper reference line UL is displayed on the upper side of the three lanes SR so as to cross the lanes SR1, SR2, and SR3 at the position apart from the upper end portions of the lanes SR1, SR2, and SR3 by a predetermined distance. During execution of a music game, that is, during the progress of reproduction of music, objects 60 serving as an operation indication mark are displayed on the lanes SR1, SR2, and SR3 according to the sequence data 28.

The object 60 appears from the upper end portion of each of the lanes SR1, SR2, and SR3 at an appropriate timing in a piece of music, passes through the upper reference line UL, and moves toward the operation reference mark 55 at the lower side according to the progress of a piece of music as indicated by an arrow A in FIG. 3. The player is required to perform a touch operation of touching the operation reference mark 55 of the lane SR on which the object 60 is displayed in tune with an arrival of the object 60 at the operation reference mark 55. Here, when the player performs the touch operation, a time difference between a time at which the object 60 matches with the operation reference mark and a time at which the player performs the touch operation is detected. The smaller the time difference is, the higher the player's operation is evaluated. Further, a sound effect corresponding to each object 60 is reproduced from the speaker 14 in response to the touch operation. In the example of FIG. 3, the objects 60 are displayed on the upper side of the first lane SR1 and the middle portion of the third lane SR3, respectively, and are moving toward the operation reference mark 55. It is preferable that the player touch the operation reference mark 55 positioned on the third lane SR3, for example, in tune with an arrival of the object 60 at the operation reference mark 55 of the third lane SR3. In this embodiment, three operating units are formed by combination of the operation reference mark 55 and the lanes SR1, SR2, and SR3 displayed on the monitor 3, and the touch panel 5 superimposed thereon. Further, in the following, the operation reference mark 55 or each of the lanes SR1, SR2, and SR3 may be used as a term representing the operating unit.

Figure 4:
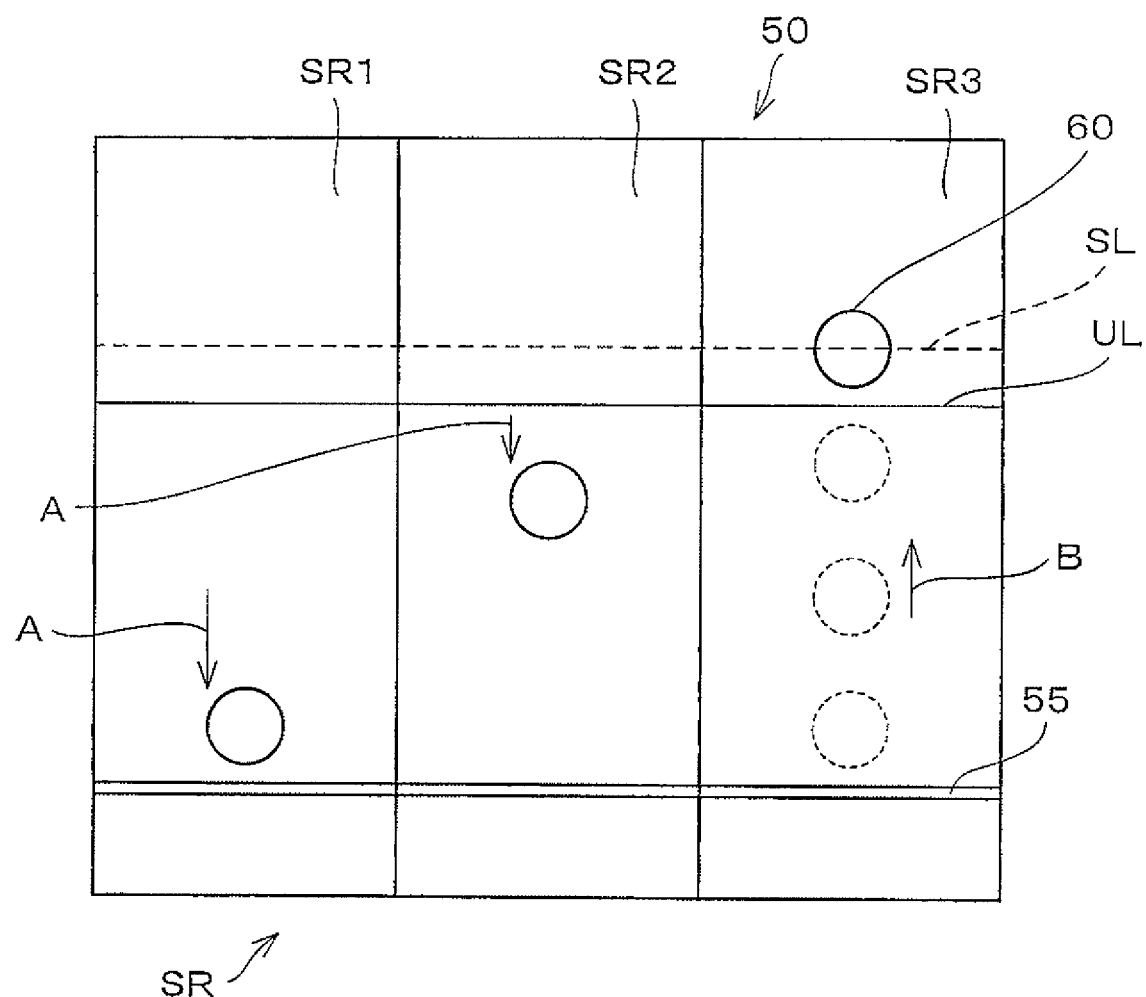
FIG. 4 is a diagram schematically illustrating a game screen when an appropriate touch operation is executed.

Further, when an appropriate touch operation is executed in tune with an arrival of each object 60 at the operation reference mark 55, the object 60 moves back up to a predetermined position SL present in a direction in which the object 60 has moved along the lane SR on which the appropriate touch operation is executed, that is, in an upper direction. FIG. 4 is a diagram schematically illustrating a game screen when the appropriate touch operation is executed. FIG. 4 illustrates an example in which an appropriate operation is performed on the third lane SR3, that is, the example in which the touch operation is performed on the operation reference mark positioned on the third lane SR3 in tune with an arrival of the object 60 at the operation reference mark 55. As illustrated in FIG. 4, in third lane SR3, the object 60 on which the appropriate touch operation has been executed moves back toward the upstream side in the moving direction in response to the touch operation. An arrow B in FIG. 4 represents a direction in which the object 60 on which the appropriate touch operation has been executed moves back. And, after the object 60 moves back to the predetermined position SL indicated by a dashed line above the upper reference line UL, the object 60 moves downward, that is, toward the operation reference mark 55 again along the third lane SR3 in order to indicate new operation timing. In addition, in FIGS. 4 and 5, the predetermined position SL is indicated by the dashed line, but the predetermined position SL is not displayed on the actual game screen. For this reason, the upper reference line UL is provided as a reference to the predetermined position SL.

Figure 5:
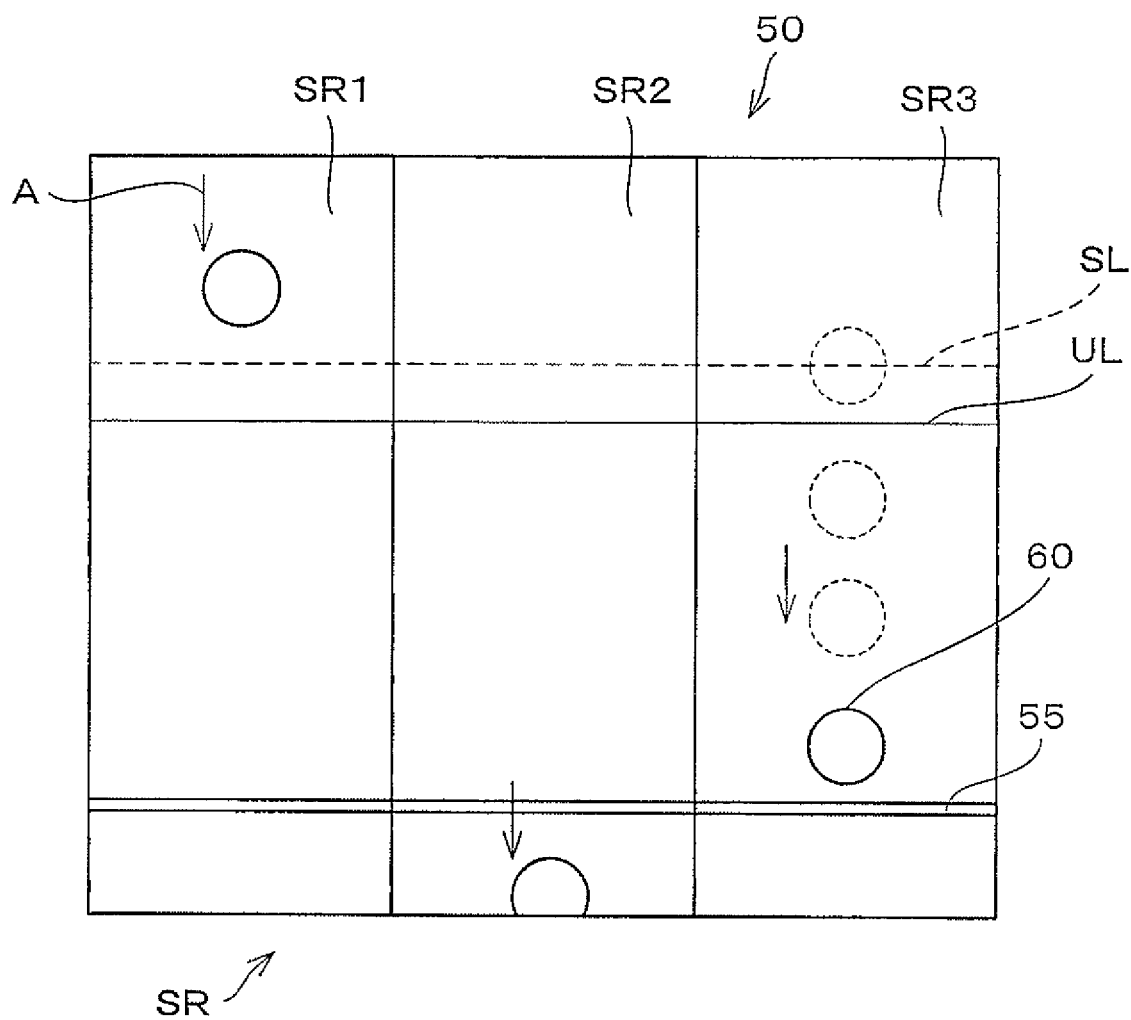
FIG. 5 is a diagram schematically illustrating a game screen after a predetermined time elapses from a state of FIG. 4.

FIG. 5 is a diagram schematically illustrating a game screen after a predetermined time elapses from the state of FIG. 4. As illustrated in FIG. 5, the object 60 that has moved up to a part above the upper reference line UL in the third lane SR3 moves toward the operation reference mark 55 again right up to the operation reference mark 55. The player is required to perform an appropriate operation again in tune with an arrival of the object 60 at the operation reference mark 55. Then, when the appropriate operation is executed on the object 60, the object 60 moves upward again. In other words, as long as the appropriate touch operation is executed, the object 60 repeats upward retreat movement and downward movement.

Meanwhile, the object 60 on which the appropriate touch operation has not been executed passes through the operation reference mark 55 and then disappears from the game screen 50. Then, a new object 60 appears from the upper end portion, and moves toward the operation reference mark 55. The example of FIG. 5 illustrates a state directly before the object 60 of the second lane SR2 which is the object 60 on which the appropriate touch operation has not been executed disappears from the game screen 50. Further, FIG. 5 illustrates the example in which the appropriate operation has not been executed on the object 60 displayed on the first lane SR1 in FIG. 4. In this case, in the first lane SR1, a new object 60 appears from the upper end portion, and moves toward the operation reference mark 55 at the lower side as illustrated in FIG. 5. As described above, a game is played such that the player executes an appropriate operation on the object 60 moving downward from the upper side at an appropriate timing, and when an appropriate operation has been executed, an object returned to the upper side is repeatedly used as the object 60 indicating new operation timing.

Figure 6:
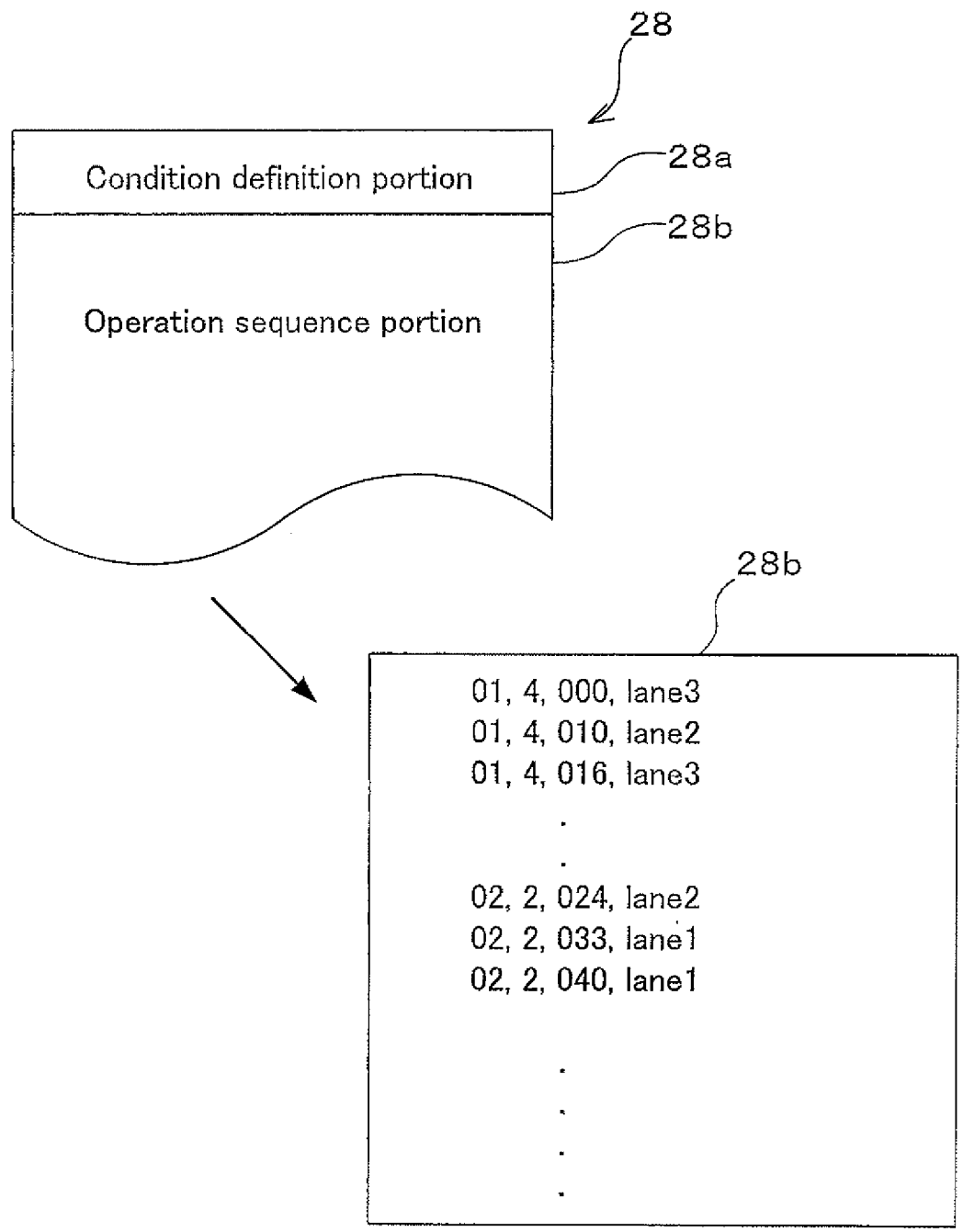
FIG. 6 is a diagram illustrating an example of content of sequence data.

Next, the details of the sequence data 28 will be described with reference to FIG. 6. The sequence data 28 includes a condition definition portion 28a and an operation sequence portion 28b as illustrated in FIG. 6. In the condition definition portion 28a, there is described information designating an execution condition of a game that differs according to a piece of music, such as information designating the tempo, a beat, a track of music, a sound effect to be generated when the touch operation is performed on the object 60, or the like. In addition, in FIG. 6, the condition definition portion 28a is provided in the head portion of the sequence data 28, but the condition definition portion 28a may be added to an appropriate intermediate position of the operation sequence portion 28b. Thus, processes including a change of the tempo of music, an assignment of a sound effect, or the like can be achieved.

Meanwhile, in the operation sequence portion 28b, operation timing of lanes SR are described in association with information designating any one of lanes SR1, SR2, and SR3. As partially illustrated in FIG. 6, the operation sequence portion 28b is configured as a set of a plurality of records in which a timing (operation timing) to perform an operation in music is associated with information designating each of lanes SR1, SR2, and SR3 (corresponding to the operating unit). The operation timing is described such that a bar number in music, beats, and a value representing a time in a beat are separated by a comma. A time in a beat represents an elapsed time from the head of one beat, and is represented by the number of units, from the head of the beat, obtained by equally dividing the time length of one beat into n unit times. For example, when n is 100 and ¼ has elapsed from the head of a second beat in a second beat of a first bar of a piece of music is designated as an operation timing or a display start timing, "01,2,025" is described.

For the lanes SR1, SR2, and SR3, "lane 1" is described when the first lane SR1 is designated, "lane2" is described when the second lane SR2 is designated, and "lane3" is described when the third lane SR3 is designated. In the example of FIG. 6, an operation timing and an operating unit are designated such that the touch operation is performed on the operation reference mark 55 on the third lane SR3 at a starting point in time (000) of a fourth beat of a first bar, the touch operation is performed on the operation reference mark 55 on the second lane SR2 at a timing in which "010" has elapsed from the starting point in time of the fourth beat of the first bar, and the touch operation is performed on the operation reference mark 55 on the third lane SR3 at a timing in which "016" has elapsed from the starting point in time of the fourth beat of the first bar. The sequence processing unit 15 of the game control unit 11 controls a display of each of the lanes SR1, SR2, and SR3 such that the operation reference mark 55 matches with the object 60 at an operation timing designated by the sequence data 28.

Next, a process of the game control unit 11 when the game machine 1 executes a music game will be described. The game control unit 11 reads the game program 21 and performs initial setting necessary to execute a music game, and then is on standby for a game start instruction from the player. For example, the game start instruction includes an operation specifying data used in a game such as selection of a piece of music to be played in a game or a difficulty level. A procedure receiving the instruction may be the same as in a known game.

When a game start is instructed, the game control unit 11 causes reproduction of the music to be started through the speaker 14 by reading the music data 25 corresponding to music selected by the player and outputting the read music data 25 to the audio output control unit 13. Through this operation, the control unit 10 functions as a music reproducing device. Further, the game control unit 11 causes the game screen 50 to be displayed on the monitor 3 by reading the sequence data 28 corresponding to the player's selection in synchronization with reproduction of the music, generating image data necessary for the game screen 50 with reference to the image data 27, and outputting the generated image data to the display control unit 12. Further, as processes necessary to display the game screen 50 or the like during execution of the music game, the game control unit 11 repeatedly executes a sequence process routine illustrated in FIG. 7, an object assignment process routine illustrated in FIG. 8, and an operation evaluation routine illustrated in FIG. 9 in a predetermined cycle. In addition, the sequence processing unit 15 handles the routines of FIGS. 7 and 8, and the operation evaluating unit 16 handles the operation evaluation routine of FIG. 9.

Figure 7:
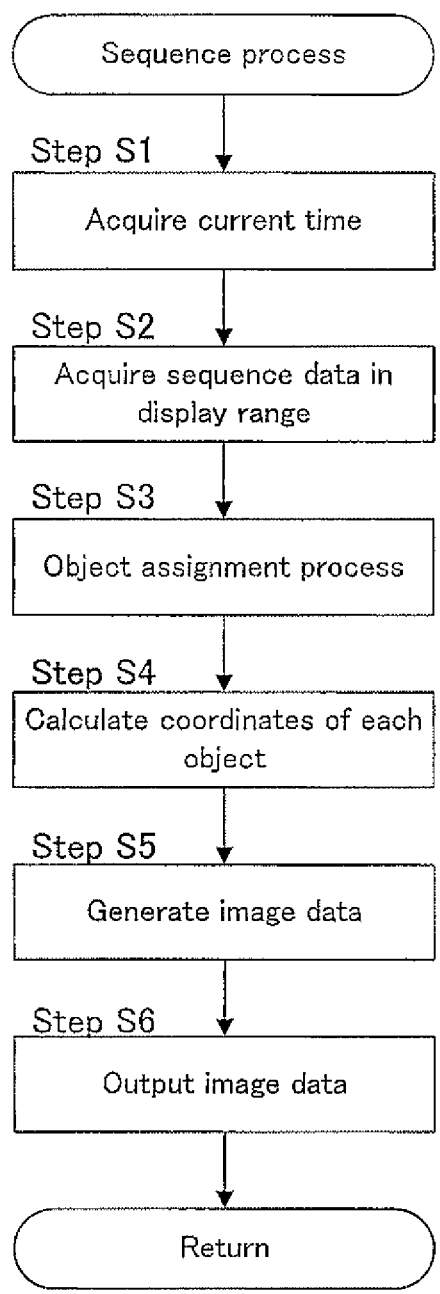
FIG. 7 is a diagram illustrating an example of a flowchart of a sequence process routine.

FIG. 7 illustrates an example of a flowchart of the sequence process routine executed by the sequence processing unit 15. When the routine of FIG. 7 starts, in step S1, the sequence processing unit 15 of the game control unit 11 first acquires a current time in the music. For example, clocking starts, by an internal clock of the game control unit 11, from a reproduction start point in time of the music, and the current time is acquired based on a value of the internal clock. Subsequently, in step S2, the sequence processing unit 15 acquires data of operation timing present in a time length corresponding to a display range of the game screen 50 from the sequence data 28. For example, the display range is set to a time range of about two bars of the music from the current time to the future.

Figure 8:
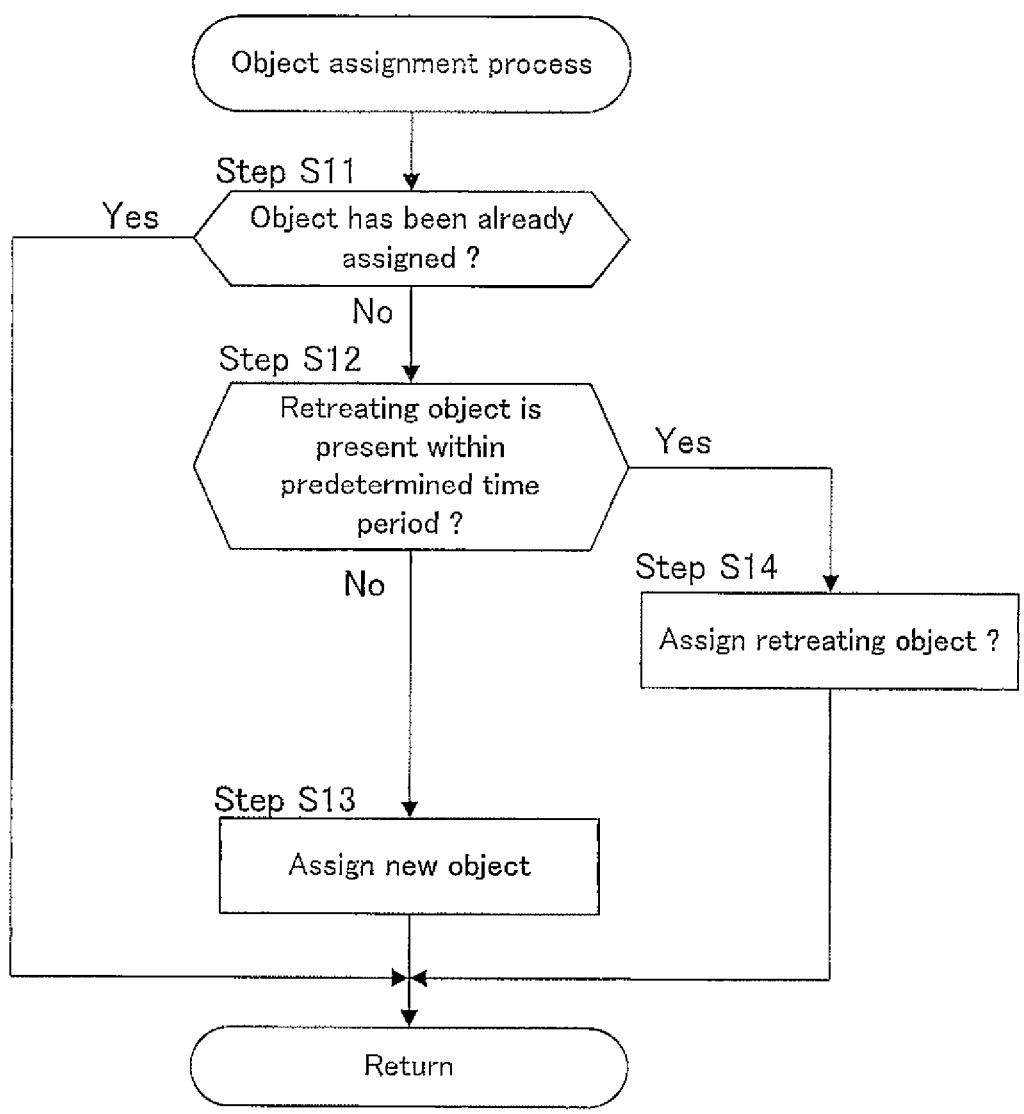
FIG. 8 is a diagram illustrating an example of a flowchart of an object assignment process routine.

Next, in step S3, the sequence processing unit 15 executes an assignment of the object 60 corresponding to each acquired operation timing. For example, this assignment is achieved by executing the routine of FIG. 8. FIG. 8 illustrates an example of a flowchart of an assignment process routine executed by the sequence processing unit 15. The sequence processing unit 15 executes the routine of FIG. 8 on each of acquired operation timings. When the routine of FIG. 8 is started, in step S11, the sequence processing unit 15 determines whether or not the object 60 has been already assigned to an operation timing of a target. When the determination result is positive, that is, when it is determined that the object 60 has been already assigned to an operation timing of a target, the subsequent process is skipped, and the current routine ends. In addition, an example of determining the presence or absence of the assignment will be described in detail in subsequent step S13.

When the determination result in step S11 is negative, the sequence processing unit 15 proceeds to step S12. In step S12, the lane SR on which an operation timing of a target is to be displayed is determined based on the description of the sequence data 28, and it is determined whether or not a retreating object 60 is present in the determined lane SR within a predetermined time period. The retreating object 60 represents the object 60 that moves back up to a part above the upper reference line UL in the third lane SR3 in the example of FIG. 4. The details of processing of the retreating object 60 will be described with reference to the routine of FIG. 9. Further, when an operation timing of a target is assigned to the retreating object 60, as a predetermined time period, there is set a time period in which trouble such as the high speed which is inappropriate for indicating operation timing or the like does not occur. For example, at the stage in which the assignment process is being executed, in the cases such as a case that the retreating object 60 is positioned above the upper reference line UL, a case that the retreating object 60 is positioned within a predetermined range from the upper reference line UL, or the like, the predetermined time period may be set to correspond to the position of the retreating object 60. Alternatively, a condition of a predetermined time period may be omitted. When the determination result in step S12 is negative, that is, when it is determined that no retreating object 60 is present in the lane SR of the target within a predetermined time period, the sequence processing unit 15 proceeds to step S13. On the other hand, when the determination result is positive, the sequence processing unit 15 proceeds to step S14.

In step S13, the sequence processing unit 15 assigns a new object 60 to an operation timing of a target, and then ends the current routine. For example, this assignment is achieved such that the sequence processing unit 15 adds object information used for distinction from the retreating object 60 to the operation timing. For example, information such as "A" may be added as the object information. Further, based on the presence or absence of the object information, in step S11, the sequence processing unit 15 can determine whether or not the object 60 has been already assigned to an operation timing of a target.

Meanwhile, in step S14, the sequence processing unit 15 assigns the retreating object 60 to the operation timing of the target, and ends the current routine. For example, this assignment can be achieved by adding the object information to the operation timing as described above. Further, in this case, for example, "S" may be used as object information corresponding to the retreating object 60.

In addition, the assignment process of the object 60 is not limited to the above-described example. For example, when the retreating object 60 is present in the lane SR corresponding to the operation timing of the target, the assignment can be also achieved by correcting an appearance position at which a next object 60 appears to the predetermined position SL above the upper reference line UL up to which the retreating object 60 moves upward. In this case, the retreating object 60 disappears at the predetermined position SL to which the retreating object 60 has moved back along the moving direction, a new object 60 indicating a next operation timing appears at the disappearance position, and the new object 60 moves toward the operation reference mark 55 to arrive at the appropriate timing. Thus, a rendering effect by which a single object 60 repeatedly moves up and down can be made.

Referring back to the routine of FIG. 7, subsequently, in step S4, the sequence processing unit 15 calculates coordinates of each object 60 which has been subjected to the assignment in step S3 in the game screen 50. For example, this calculation is performed as follows. Among the lanes SR1, SR2, and SR3, the lane on which the object 60 is to be arranged is determined based on a designation of any one of the lanes SR1, SR2, and SR3 associated with an operation timing corresponding to each object 60, that is, a designation of any one of "lane1" to "lane3" in the example of FIG. 6. Next, the position of each object 60 from the operation reference mark 55 in the time axis direction (that is, the moving direction of the object 60) is determined based on a time difference between each operation timing and a current time. Through this operation, it is possible to acquire coordinates of each object 60 necessary to arrange each object 60 on the designated one of the lanes SR1, SR2, and SR3 along the time axis from the operation reference mark 55. Further, at this time, coordinates of the retreating object 60 are calculated by considering the predetermined position SL above the upper reference line UL to which the retreating object 60 moves up as the appearance position.

Next, in step S5, the sequence processing unit 15 generates image data necessary to render the game screen 50 based on the coordinates of each object 60 calculated in step S4. Specifically, the image data that causes each object 60 to be arranged at the calculated coordinates is generated. Subsequently, in step S6, the sequence processing unit 15 outputs the image data to the display control unit 12. As a result, the game screen 50 is displayed on the monitor 3. When the process of step S6 ends, the sequence processing unit 15 ends the current sequence process routine. By repeatedly executing the above process, the objects 60 are displayed to move along the lanes SR1, SR2, and SR3 such that the object 60 arrives at the operation reference mark 55 at operation timing described in the sequence data 28. Further, when the appropriate operation is executed on the operation reference mark 55 at an appropriate timing, the retreating object 60 that moves back up to the predetermined position SL above the upper reference line UL and then moves toward the operation reference mark 55 again is displayed to move toward the operation reference mark 55 to match with the operation reference mark 55 at a new operation timing as the object 60 indicating the new operation timing.

Figure 9:
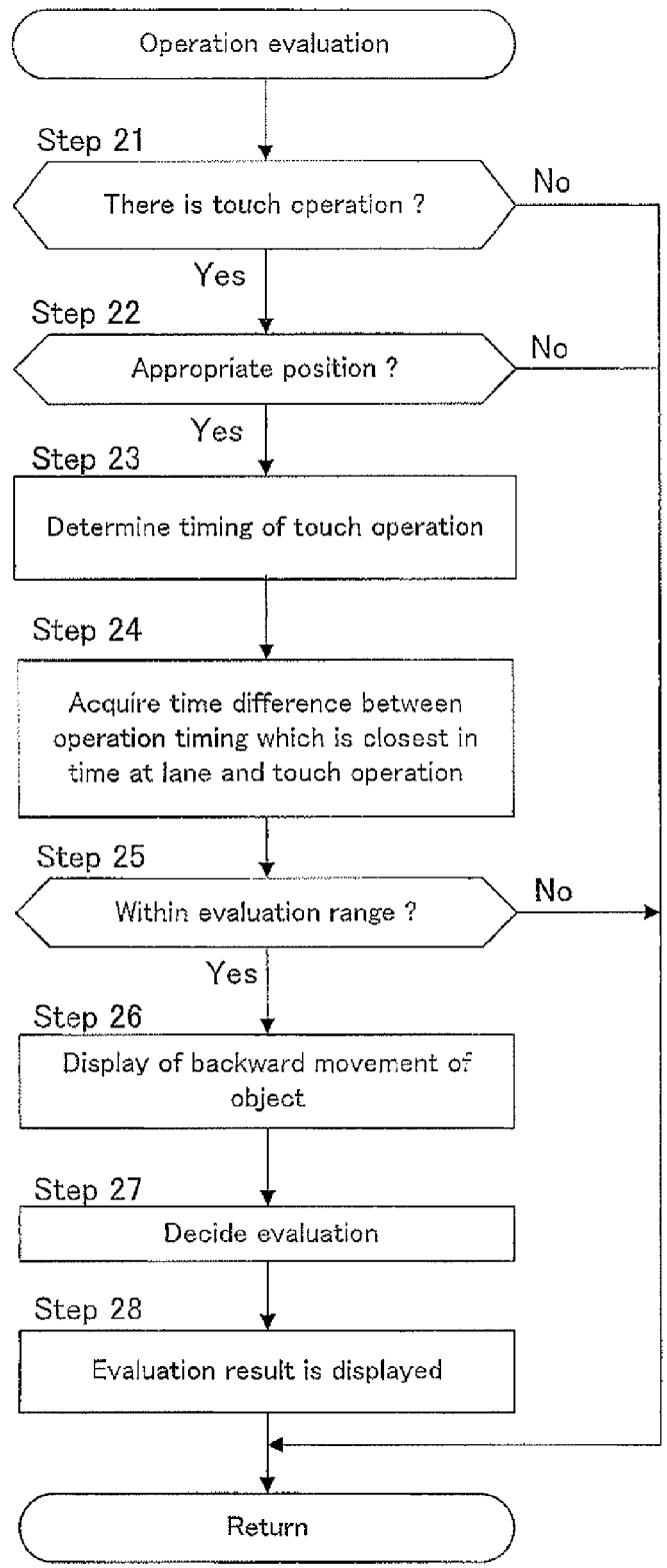
FIG. 9 is a diagram illustrating an example of a flowchart of an operation evaluation routine.

Next, the operation evaluation routine of FIG. 9 will be described. When the operation evaluation routine of FIG. 9 starts, in step S21, the operation evaluating unit 16 first determines the presence or absence of the touch operation on the operation reference mark 55 with reference to an output signal of the touch panel 5. At this time, when the position other than the operation reference mark 55 is touched, it is determined that there is no touch operation. When it is determined that there is no touch operation, the operation evaluating unit 16 ends the current routine. On the other hand, when it is determined that there is the touch operation, the operation evaluating unit 16 proceeds to step S22. In step S22, the operation evaluating unit 16 determines the position of the operation reference mark 55 at which the touch operation is performed based on the position signal output from the touch panel 5, and then further determines whether or not the determined position of the operation reference mark 55 is an appropriate position. At this time, the operation evaluating unit 16 first specifies a lane SR corresponding to a nearest operation timing described in the sequence data 28, that is, a lane SR corresponding to an operation timing which is closest in time in the sequence data 28. And, the operation evaluating unit 16 employs the position of the operation reference mark 55 on the lane SR corresponding to the specified operation timing as an appropriate position. Thus, the operation evaluating unit 16 compares the position of the operation reference mark 55 on the lane SR corresponding to the operation timing which is closest in time in the sequence data 28 with the position of the operation reference mark 55 at which the touch operation has been performed, and determines whether or not the position of the touch operation is appropriate. When the determination result in step S22 is positive, the operation evaluating unit 16 proceeds to step S23. On the other hand, when the determination result is negative, the operation evaluating unit 16 skips the subsequent process, and ends the current routine.

In step S23, the operation evaluating unit 16 determines timing (a time in music) at which the touch operation is performed. Subsequently, in step S24, the operation evaluating unit 16 specifies a nearest operation timing described in the sequence data 28, that is, an operation timing which is closest in time in the sequence data 28, and acquires a time difference between the operation timing and a time at which the touch operation has been made. Next, in step S25, the operation evaluating unit 16 determines whether or not the player's operation is appropriate by determining whether or not the time difference is within an evaluation range. A predetermined time range before and after an operation timing of a comparison target is set as the evaluation range. For example, a plurality of steps of levels is set centering on the operation timing, and a time range in which the levels are set is used as the evaluation range. When it is determined in step S25 that the time difference is outside the evaluation range, the operation evaluating unit 16 ends the current routine. On the other hand, when it is determined that the time difference is within the evaluation range, the operation evaluating unit 16 proceeds to step S26.

In step S26, the operation evaluating unit 16 starts a display of a backward movement that the object 60 arriving at the operation reference mark 55 moves back toward the predetermined position SL above the upper reference line UL. As a result, the object 60 starts to move toward the predetermined position SL above the upper reference line UL in an upper direction which is a direction reverse to the moving direction. This object 60 serves as the retreating object 60 in the routines of FIGS. 8 and 9. In step S27, the operation evaluating unit 16 decides an evaluation on the player's touch operation based on the time difference acquired in step S24. For example, this evaluation is achieved by determining whether or not a timing of the touch operation belongs to any one of a plurality of levels set in the time range. A plurality of levels are set such that the time range is divided in units of predetermined time periods, and the touch operation that belongs to a division close to an operation timing of each division is highly evaluated. Thereafter, the operation evaluating unit 16 proceeds to step S28, and controls an output to the display control unit 12 such that the evaluation result is displayed on the game screen 50. When the process of step S28 is completed, the operation evaluating unit 16 ends the current routine.

As described above, according to the game machine of this embodiment, the object 60 starts to move back in a direction reverse to the moving direction in response to the appropriate touch operation. And, the object 60 that has moved back starts to move toward the operation reference mark 55 from the predetermined position SL again in order to indicate a new operation timing. In other words, the distance between the object 60 and the operation reference mark 55 can be not only decreased but also increased. Further, since the operation timing is guided using the object 60 that repeatedly moves forward or backward with respect to the operation reference mark 55, the player needs to take the course of the object 60 after the touch operation into account. For this reason, compared to when the object 60 just moves toward the operation reference mark 55 to reduce the distance, a new game element can be added. Thus, amusement of a game can be improved.

In the above embodiment, the external storage device 20 of the game machine 1 serves as a music data storage device and a sequence data storage device. Further, the control unit 10 serves as an operation guide device and a direction change device by causing the sequence processing unit 15 to execute the routines of FIGS. 7 and 8. Furthermore, the control unit 10 serves as a distance change device and an evaluating device by causing the operation evaluating unit 16 to execute the routine of FIG. 9.

The invention is not limited to the above embodiment and can be embodied in appropriate embodiments. In the above embodiment, an evaluation result of the player's touch operation is used as the predetermined condition. And, when the touch operation is appropriate, backward movement and forward movement with respect to the operation reference mark are repeatedly executed. In this case, an evaluation may be executed based on the number of times that the object 60 repeats backward movement and forward movement with respect to the operation reference mark. For example, an evaluation may be executed such that a bonus score is given each time the number of repetition times reaches 10 times, 20 times, or the like.

Further, in the above embodiment, an evaluation result of the player's touch operation is used as the predetermined condition, but the invention is not limited to this example. For example, the presence or absence of the player's touch operation may be used as the predetermined condition instead of the evaluation result. Further, various kinds of conditions may be used as the predetermined condition according to a game progress condition such as an option for the progress of a game or the development of a game.

In the above embodiment, an intermediate state of the backward movement of the object 60 that retreats upward from the operation reference mark 55 to the predetermined position SL above the upper reference line UL is also displayed, but the intermediate movement state may not be displayed. In other words, the intermediate state of the backward movement of the object 60 that started to move backward is not displayed, and instead, a display may be performed such that the object 60 instantly moves to the predetermined position SL of a target position above the upper reference line UL.

In the above embodiment, the object 60 serving as the operation indication mark moves toward the operation reference mark 55, but the invention is not limited to this embodiment. For example, the operation reference mark may move toward the operation indication mark, or both the operation reference mark and the operation indication mark may be displaced.

Further, in the above embodiment, it is possible to discriminate an operating unit corresponding to each operation timing by using a lane discriminated for each operating unit, but the present invention is not limited to this embodiment. For example, each operating unit may be discriminated using an operation indication mark that differs in color, shape, or the like according to each operating unit. Further, in the above embodiment, a plurality of operating units is disposed, but the present invention is not limited to this embodiment. The present invention can be applied even when a single operating unit is disposed.

In the above embodiment, the touch panel is used as the input device, but the input device is not limited to this embodiment. For example, as long as an operating unit is disposed like a controller in which a plurality of push buttons serving as an operating unit are provided, input devices having various configurations may be used.

In the above embodiments, the game machine 1 is configured as a music game machine in which music is reproduced, and an operation indication mark moves toward an operation reference mark based on a played time of the music. However, the present invention is not limited to this embodiment. The game machine 1 can execute various kinds of games as long as operation timing is indicated through a video. Furthermore, the game system of the invention may be actualized in appropriate embodiments such as a game machine for business use installed in commercial facilities, a stationary game machine for home use, a portable game machine, or a game system implemented using a network.

REFERENCE SIGNS LIST

1: Game machine
3: Monitor (display device)
5: Touch panel (input device and operating unit)
14: Speaker (audio output device)
10: Control unit (computer, operation guide device, distance change device, direction change device, evaluating device, and music reproducing device)
20: External storage device (music data storage device and sequence data storage device)
21: Game program
22: Game data
25: Music data
28: Sequence data
50: Game screen
55: Operation reference mark
60: Object (operation indication mark)
SR1: First lane (predetermined path)
SR2: Second lane (predetermined path)
SR3: Third lane (predetermined path)
SL: Predetermined position
UL: Upper reference line

What is claimed is:

1. A game system comprising:
    an input device that includes at least one operating unit;
    a display device that displays and outputs a game screen;
    a sequence data storage device that stores sequence data in which operation timing of the operating unit during a game is described; and
    an operation guide device that guides a player to operate the operating unit by causing an operation indication mark corresponding to the operation timing and an operation reference mark corresponding to a current time in the game to be displayed on the game screen based on the sequence data, generating relative displacement along a predetermined path according to the progress of the game between the operation indication mark and the operation reference mark such that a distance between the operation indication mark and the operation reference mark decreases based on a time difference between an operation timing guided through the operation indication mark and the current time, and the operation indication mark matches with the operation reference mark at the operation timing guided through the operation indication mark, and wherein the operation guide device includes a distance change device that changes a distance between the operation reference mark and the operation indication mark according to a predetermined condition.

2. The game system according to claim 1, wherein the distance change device uses a predetermined operation as the predetermined condition, and changes the distance between the operation reference mark and the operation indication mark in response to the predetermined operation.

3. The game system according to claim 1, wherein the distance change device changes the distance between the operation reference mark and the operation indication mark by changing a direction of the relative displacement along the predetermined path between the operation indication mark and the operation reference mark up to a predetermined position in a reverse direction.

4. The game system according to claim 3, wherein the operation guide device further includes a direction change device that generates the relative displacement in an original direction from the predetermined position such that the operation indication mark matches with the operation reference mark at operation timing described in the sequence data.

5. The game system according to claim 1, wherein the operation guide device moves the operation indication mark toward the operation reference mark as the relative displacement along the predetermined path.

6. The game system according to claim 1, further comprising an evaluating device that evaluates an operation in at least one operating unit based on timing of the operation on the operating unit and the operation timing designated in the sequence data.

7. The game system according to claim 6, wherein the distance change device uses an evaluation result of the evaluating device as the predetermined condition, and changes the distance between the operation reference mark and the operation indication mark according to the evaluation result.

8. The game system according to claim 1, wherein the input device includes a plurality of operating units, the operation timing is described in the sequence data so as to be associated with information designating any one of the plurality of operating units, and the operation guide device generates the relative displacement along the predetermined path in an aspect in which an operating unit corresponding to each operation timing can be discriminated.

9. The game system according to claim 8, wherein the operation guide device generates the relative displacement along the predetermined path in a aspect in which an operating unit corresponding to each operation timing can be discriminated by displaying a plurality of paths each of which is discriminated for each operating unit and corresponds to each operating unit on the game screen as the predetermined path.

10. The game system according to claim 1, wherein a touch panel arranged on the display device so as to cover the game screen is used as the input device.

11. The game system according to claim 1, further comprising:

an audio output device that reproduces and outputs a game sound;

a music data storage device that stores music data for reproducing music; and a music reproducing device that causes the audio output device to reproduce the music based on the music data, and wherein the operation timing of the operating unit during reproduction of the music is described in the sequence data.

12. A control method of controlling a computer which is incorporated in a game system comprising: an input device that includes at least one operating unit; a display device that displays and outputs a game screen; a sequence data storage device that stores sequence data in which operation timing of the operating unit during a game is described, wherein the control method of controlling the computer comprises the steps:

an operation guide step that guides a player to operate the operating unit by causing an operation indication mark corresponding to the operation timing and an operation reference mark corresponding to a current time in the game to be displayed on the game screen based on the sequence data, generating relative displacement along a predetermined path according to the progress of the game between the operation indication mark and the operation reference mark such that a distance between the operation indication mark and the operation reference mark decreases based on a time difference between an operation timing guided through the operation indication mark and the current time, and the operation indication mark matches with the operation reference mark at the operation timing guided through the operation indication mark; and a distance change step that changes a distance between the operation reference mark and the operation indication mark according to a predetermined condition in the operation guide step.

13. A non-transitory storage medium storing a computer program for a game system comprising: an input device that includes at least one operating unit; a display device that displays and outputs a game screen; a sequence data storage device that stores sequence data in which operation timing of the operating unit during a game is described, wherein the computer program is configured to cause a computer which is incorporated in the game system to serve as;

an operation guide device that guides a player to operate the operating unit by causing an operation indication mark corresponding to the operation timing and an operation reference mark corresponding to a current time in the game to be displayed on the game screen based on the sequence data, generating relative displacement along a predetermined path according to the progress of the game between the operation indication mark and the operation reference mark such that a distance between the operation indication mark and the operation reference mark decreases based on a time difference between an operation timing guided through the operation indication mark and the current time, and the operation indication mark matches with the operation reference mark at the operation timing guided through the operation indication mark, and the computer program is configured to further cause the operation guide device to serve as; a distance change device that changes a distance between the operation reference mark and the operation indication mark according to a predetermined condition.

* * * * *